US010673557B2

(12) United States Patent
Bagheri et al.

(10) Patent No.: US 10,673,557 B2
(45) Date of Patent: Jun. 2, 2020

(54) RATE-MATCHING A DATA TRANSMISSION AROUND RESOURCES

(71) Applicant: Lenovo (Singapore) Pte. Ltd., New Tech Park (SG)

(72) Inventors: Hossein Bagheri, Urbana, IL (US); Vijay Nangia, Woodridge, IL (US)

(73) Assignee: Lenovo (Singapore) PTE LTD, New Tech Park (SG)

(*) Notice: Subject to any disclaimer, the term of this patent is extended or adjusted under 35 U.S.C. 154(b) by 0 days.

(21) Appl. No.: 16/249,503

(22) Filed: Jan. 16, 2019

(65) Prior Publication Data

US 2019/0222400 A1 Jul. 18, 2019

Related U.S. Application Data

(60) Provisional application No. 62/618,014, filed on Jan. 16, 2018.

(51) Int. Cl.
*H04L 1/00* (2006.01)
*H04W 72/04* (2009.01)
(Continued)

(52) U.S. Cl.
CPC .......... *H04L 1/0013* (2013.01); *H04L 1/0045* (2013.01); *H04L 1/0068* (2013.01); (Continued)

(58) Field of Classification Search
CPC .............. H04W 48/12; H04W 72/042; H04W 72/1273; H04W 74/006; H04W 28/22; H04L 1/0013; H04L 1/0067; H04L 1/08
See application file for complete search history.

(56) References Cited

U.S. PATENT DOCUMENTS 9,270,440 B2 * 2/2016 Chen ................. H04L 5/0055
2013/0039284 A1 * 2/2013 Marinier ............ H04L 5/001
370/329
(Continued)

FOREIGN PATENT DOCUMENTS

EP 2919402 A1 9/2015

OTHER PUBLICATIONS

PCT/IB2019/000050,"Notification of Transmittal of The International Search Report and The Written Opinion of the International Searching Authority, or The Declaration", International Searching Authority, dated May 13, 2019, pp. 1-13.
(Continued)

*Primary Examiner* — Ashley Shivers
(74) *Attorney, Agent, or Firm* — Kunzler Bean & Adamson

(57) ABSTRACT

Apparatuses, methods, and systems are disclosed for rate-matching a data transmission around resources. One method includes: receiving a downlink control channel ("DCC") transmission in a predetermined time period; determining a first DCC candidate ("DCCC") based on the downlink control channel transmission; determining whether the first DCCC belongs to a plurality of DCCCs associated with the DCC transmission, wherein the plurality of DCCCs carry the same downlink control information ("DCI"); in response to determining that the first DCCC belongs to the plurality of DCCCs: determining a second DCCC; and determining the DCI by decoding the first and the second DCCCs; in response to determining that the first DCCC does not belong to the plurality of DCCCs: determining the DCI by decoding the first DCCC; and determining downlink resources corresponding to a data transmission; and rate-matching the data transmission.

20 Claims, 8 Drawing Sheets

(51) Int. Cl.
*H04L 5/00* (2006.01)
*H04L 1/08* (2006.01)
*H04L 27/20* (2006.01)

(52) U.S. Cl.
CPC ............. *H04L 1/0072* (2013.01); *H04L 1/08* (2013.01); *H04L 5/0053* (2013.01); *H04L 5/0064* (2013.01); *H04L 5/0082* (2013.01); *H04L 5/0094* (2013.01); *H04W 72/042* (2013.01); *H04L 5/0023* (2013.01); *H04L 27/2067* (2013.01)

(56) References Cited

U.S. PATENT DOCUMENTS

| | | | | |
|---|---|---|---|---|
| 2013/0083751 | A1* | 4/2013 | Papasakellariou | H04L 1/1854 370/329 |
| 2014/0105154 | A1* | 4/2014 | Yang | H04L 5/0053 370/329 |
| 2018/0026662 | A1* | 1/2018 | Kang | H03M 13/3961 714/776 |
| 2018/0049189 | A1* | 2/2018 | Hugl | H04W 72/042 |
| 2018/0167967 | A1* | 6/2018 | Li | H04W 72/1268 |
| 2019/0349780 | A1* | 11/2019 | Li | H04L 1/0038 |

OTHER PUBLICATIONS

Intel Corporation, "Remaining details of NB-PDCCH design", 3GPTSG RAN WG1 NB-IoT Ad-Hoc Meeting, R1-161889, Mar. 22-24, 2016, pp. 1-6.

Nokia, Alcatel-Lucent Shanghai Bell, "Resource sharing between PDCCH and PDSCH in NR", 3GPP TSG-RAN WG1 Ad Hoc Meting #2, R1-1710983, Jun. 27-30, 2017, pp. 1-7.

\* cited by examiner

RATE-MATCHING A DATA TRANSMISSION AROUND RESOURCES

CROSS-REFERENCE TO RELATED APPLICATIONS

This application claims priority to U.S. Patent Application Ser. No. 62/618,014 entitled "RATE MATCHING FOR RELIABLE COMMUNICATION" and filed on Jan. 6, 2018 for Hossein Bagheri, which is incorporated herein by reference in its entirety.

FIELD

The subject matter disclosed herein relates generally to wireless communications and more particularly relates to rate-matching a data transmission around resources.

BACKGROUND

The following abbreviations are herewith defined, at least some of which are referred to within the following description: Third Generation Partnership Project ("3GPP"), 5$^{th}$ Generation ("5G"), Positive-Acknowledgment ("ACK"), Aggregation Level ("AL"), Access and Mobility Management Function ("AMF"), Access Point ("AP"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function (""PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Radio Resource Control ("RRC"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), Subscriber Identity/Identification Module ("SIM"), Signal-to-Interference-Plus-Noise Ratio ("SINR"), Service Level Agreement ("SLA"), Session Management Function ("SMF"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, rate-matching may be performed. In such networks, rate-matching may be performed around a downlink control channel that schedules downlink data.

BRIEF SUMMARY

Methods for rate-matching a data transmission around resources are disclosed. Apparatuses and systems also perform the functions of the apparatus. One embodiment of a method includes receiving a downlink control channel transmission in a predetermined time period. In certain embodiments, the method includes determining a first downlink control channel candidate based on the downlink control channel transmission. In some embodiments, the method includes determining whether the first downlink control channel candidate belongs to a plurality of downlink control channel candidates associated with the downlink control channel transmission. In such embodiments, the plurality of downlink control channel candidates carry the same downlink control information. In various embodiments, in response to determining that the first downlink control channel candidate belongs to the plurality of downlink control channel candidates, the method includes: determining a second downlink control channel candidate of the plurality of downlink control channel candidates based on the first downlink control channel candidate and the downlink control channel transmission; and determining the downlink control information by decoding the first and the second downlink control channel candidates. In certain embodiments, in response to determining that the first downlink control channel candidate does not belong to the plurality of downlink control channel candidates, the method includes: determining the downlink control information by decoding the first downlink control channel candidate; and determining downlink resources corresponding to a data transmission based on the downlink control information. In some embodiments, the method includes rate-matching the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates.

One apparatus for rate-matching a data transmission around resources includes a receiver that receives a downlink control channel transmission in a predetermined time period. In certain embodiments, the apparatus includes a processor that: determines a first downlink control channel candidate based on the downlink control channel transmission; determines whether the first downlink control channel candidate belongs to a plurality of downlink control channel candidates associated with the downlink control channel transmission, wherein the plurality of downlink control channel candidates carry the same downlink control information; in response to determining that the first downlink control channel candidate belongs to the plurality of downlink control channel candidates: determines a second downlink control channel candidate of the plurality of downlink control channel candidates based on the first downlink control channel candidate and the downlink control channel transmission; and determines the downlink control information by decoding the first and the second downlink control channel candidates; in response to determining that the first downlink control channel candidate does not belong to the plurality of downlink control channel candidates: determines the downlink control information by decoding the first downlink control channel candidate; and determines downlink resources corresponding to a data transmission based on the downlink control information; and rate-matches the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
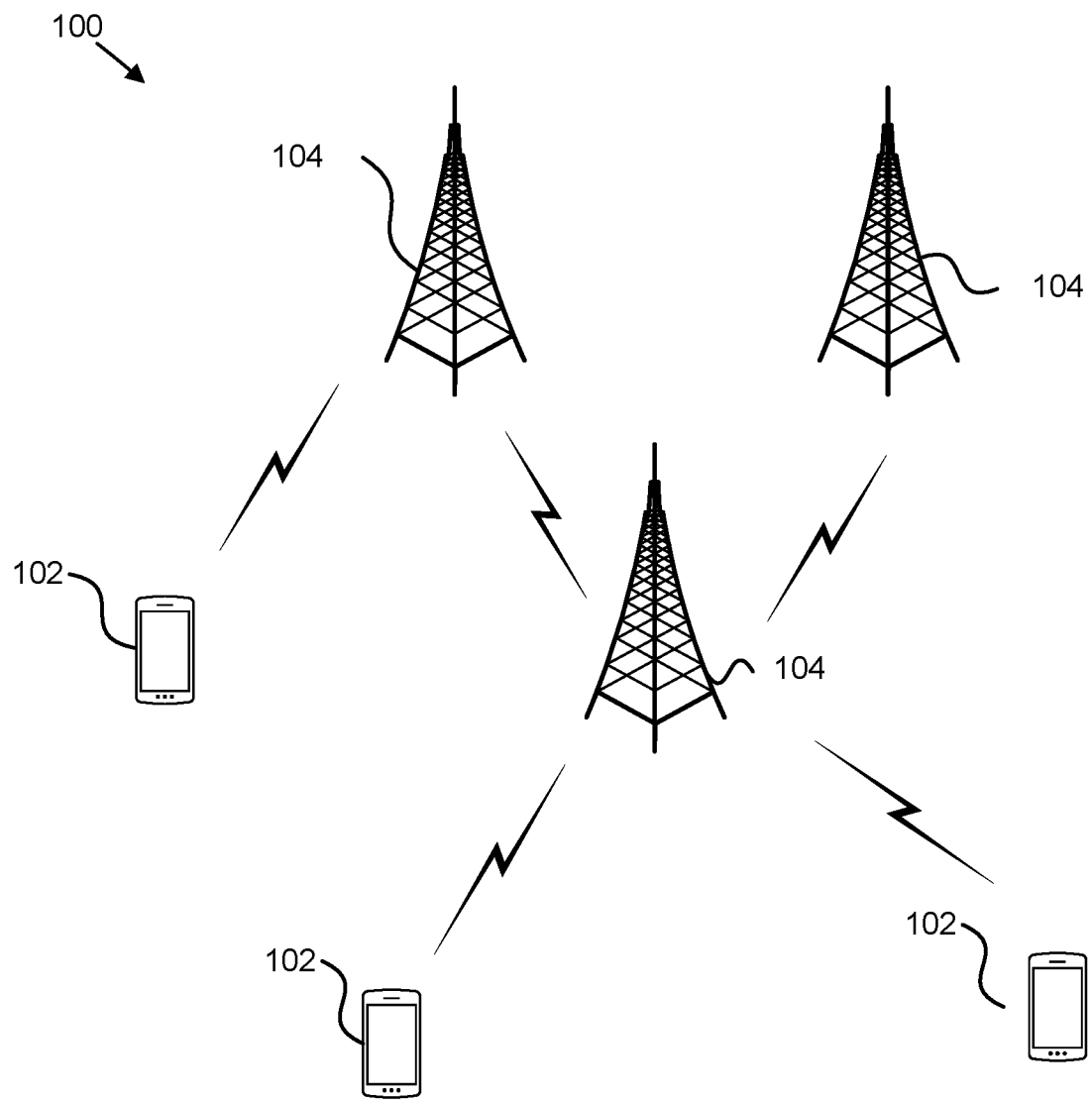
FIG. 1 is a schematic block diagram illustrating one embodiment of a wireless communication system for rate-matching a data transmission around resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for rate-matching a data transmission around resources. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receiving a downlink control channel transmission in a predetermined time period. In certain embodiments, the remote unit 102 may determine a first downlink control channel candidate based on the downlink control channel transmission. In some embodiments, the remote unit 102 may determine whether the first downlink control channel candidate belongs to a plurality of downlink control channel candidates associated with the downlink control channel transmission. In such embodiments, the plurality of downlink control channel candidates carry the same downlink control information. In various embodiments, in response to determining that the first downlink control channel candidate belongs to the plurality of downlink control channel candidates, the remote unit 102 may: determine a second downlink control channel candidate of the plurality of downlink control channel candidates based on the first downlink control channel candidate and the downlink control channel transmission; and determine the downlink control information by decoding the first and the second downlink control channel candidates. In certain embodiments, in response to determining that the first downlink control channel candidate does not belong to the plurality of downlink control channel candidates, the remote unit 102 may: determine the downlink control information by decoding the first downlink control channel candidate; and determine downlink resources corresponding to a data transmission based on the downlink control information. In some embodiments, the remote unit 102 may rate-match the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates. Accordingly, the remote unit 102 may be used for rate-matching a data transmission around resources.

In certain embodiments, a network unit 104 may transmit a downlink control channel transmission in a predetermined time period that the remote unit 102 may use to determine downlink control channel candidates. Accordingly, the network unit 104 may be used for rate-matching a data transmission around resources.

Figure 2:
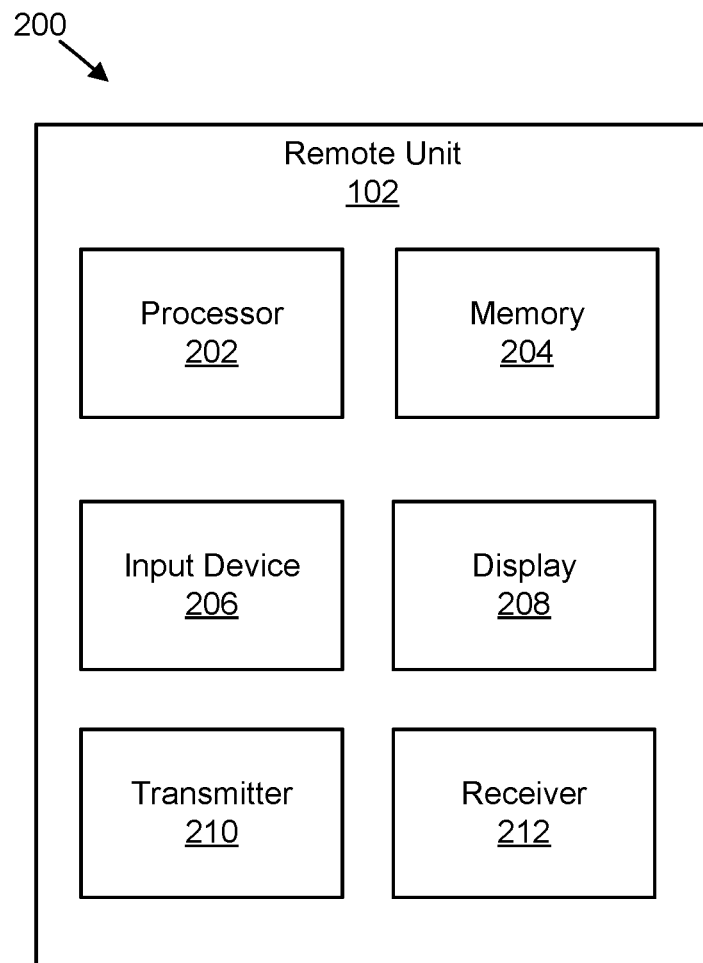
FIG. 2 is a schematic block diagram illustrating one embodiment of an apparatus that may be used for rate-matching a data transmission around resources.

FIG. 2 depicts one embodiment of an apparatus 200 that may be used for rate-matching a data transmission around resources. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a first downlink control channel candidate based on a downlink control channel transmission; determine whether the first downlink control channel candidate belongs to a plurality of downlink control channel candidates associated with the downlink control channel transmission, wherein the plurality of downlink control channel candidates carry the same downlink control information; in response to determining that the first downlink control channel candidate belongs to the plurality of downlink control channel candidates: determine a second downlink control channel candidate of the plurality of downlink control channel candidates based on the first downlink control channel candidate and the downlink control channel transmission; and determine the downlink control information by decoding the first and the second downlink control channel candidates; in response to determining that the first downlink control channel candidate does not belong to the plurality of downlink control channel candidates: determine the downlink control information by decoding the first downlink control channel candidate; and determine downlink resources corresponding to a data transmission based on the downlink control information; and rate-match the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives a downlink control channel transmission in a predetermined time period.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
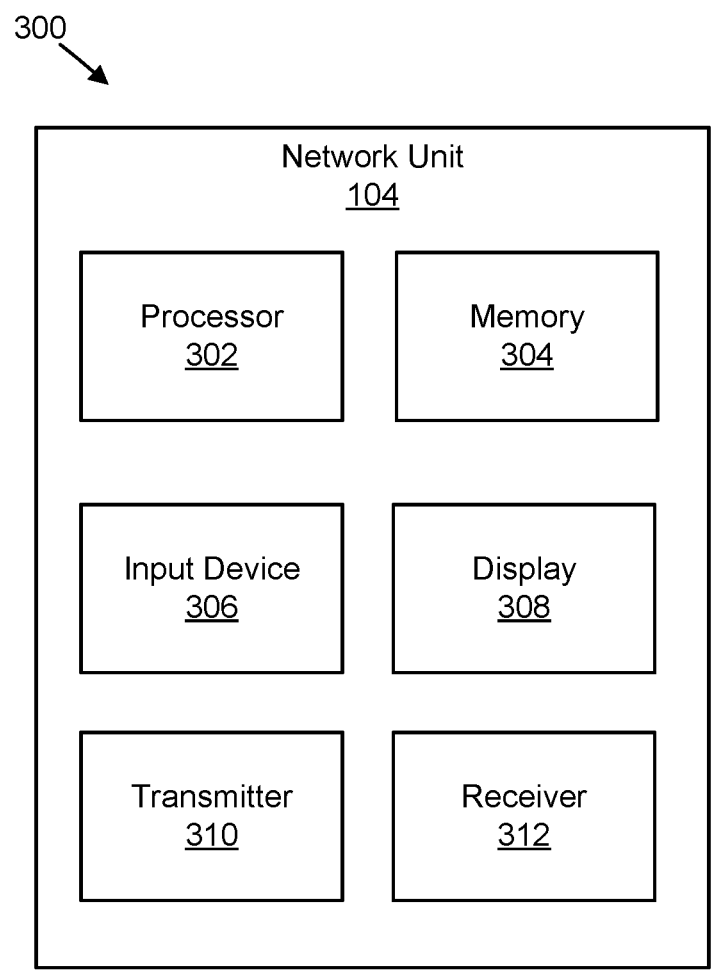
FIG. 3 is a schematic block diagram illustrating one embodiment of an apparatus that may be used for rate-matching a data transmission around resources.

FIG. 3 depicts one embodiment of an apparatus 300 that may be used for rate-matching a data transmission around resources. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations, a UE may rate-match around its own DL control channel that schedules DL data (e.g., PDCCH with DL DCI). In such configurations, a DL control channel scheduling UL data may puncture the DL data because the UE may miss an UL grant and may not be able to rate-match DL data (e.g., PDSCH) around a missed DL control channel scheduling UL data (e.g., PDCCH with UL DCI) which may cause PDSCH performance degradation (e.g., a UE missing PDCCH with UL DCI may assume that the UL DCI has not been transmitted and may assume that PDSCH rate matches around the REs used for DL control scheduling DL data (and other REs known by the UE to be used or reserved for other purposes such as RS REs, and REs explicitly configured, and/or signaled that are not used for PDSCH mapping). Hence, if the PDSCH is not rate-matched around the PDCCH with UL DCI (which the UE missed), the PDSCH may be undecodable). In some embodiments, such as for URLLC, both reliability and latency requirements may need to be met. In contrast, in certain embodiments, such as for sTTI operation, only a latency requirement may need to be met. To satisfy a reliability requirement, DL control (e.g., PDCCH) with the same DCI may be transmitted multiple times (e.g., in a frequency domain, in a time domain, and/or in a space domain).

Figure 4:
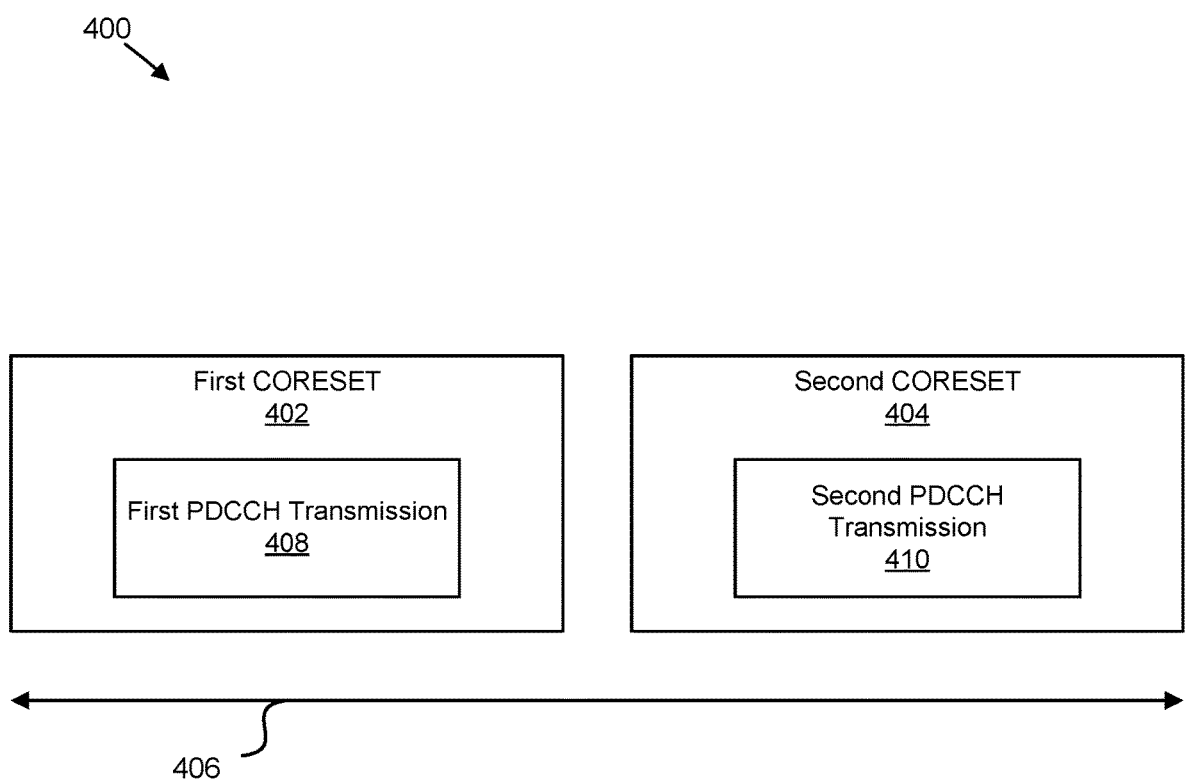
FIG. 4 is a schematic block diagram illustrating one embodiment of communications including a PDCCH repetition.

FIG. 4 is a schematic block diagram illustrating one embodiment of communications 400 including a PDCCH repetition. The communications 400 include a first CORESET 402 and a second CORESET 404 illustrated across a frequency domain 406. The first CORESET 402 includes a first PDCCH transmission 408 and the second CORESET 404 includes a second PDCCH transmission 410. As may be appreciated, the first PDCCH transmission 408 may include the same DCI as the second PDCCH transmission 410. Moreover, the first PDCCH transmission 408 may be transmitted at approximately the same time as the second PDCCH transmission 410, but the first PDCCH transmission 408 may be transmitted over a different frequency range than the second PDCCH transmission 410 in the frequency domain 406.

In some embodiments, if PDCCH is repeated (e.g., with different PDCCH transmissions of the same DCI that corresponds to actual coded bit repetition, the same redundancy version for at least a portion of the coded bits for the same DCI, and/or different redundancy versions for the same DCI for at least some PDCCH transmissions) in different locations in the frequency domain 406 in a TTI, rate-matching may be different depending on how blind decoding candidates are defined.

In certain embodiments, a DL PDCCH is transmitted twice in the frequency domain 406 as illustrated in FIG. 4 in different CORESETs to increase PDCCH detection reliability. In other embodiments, a repeated PDCCH transmission may occur in the same CORESET.

In some embodiments, if respective locations of two transmitted PDCCHs follow predetermined rules known to a UE (e.g., if the first PDCCH transmission 408 with AL="L" is assumed to be the mth candidate in the search space in the first CORSET 402, the second PDCCH transmission 410 with AL="L" may be the (m+1) mod W candidate in the search space in the second CORSET 404, where W is the number of PDCCH candidates with AL="L" in the second CORSET 404), the UE may attempt to decode the PDCCH transmissions assuming that the two transmitted PDCCHs together correspond to a single PDCCH (e.g., control channel) candidate (e.g., in the 1st CORESET). In such embodiments, if decoding is successful, the UE rate-matches PDSCH around both PDCCHs. In some embodiments, the second PDCCH transmission 410 may use a different aggregation level than an aggregation level used for the first PDCCH transmission 408.

In various embodiments, a DL PDCCH is transmitted twice in the frequency domain 406 as illustrated in FIG. 4 in different CORESETs to increase the PDCCH detection reliability, but the respective location of the two transmitted PDCCHs may not follow predetermined rules (e.g., to give an eNB (or gNB) flexibility to schedule other UEs with more freedom). Such embodiments may correspond to PDCCH repetition without PDCCH combining gain (where, for example, LLRs of the two received PDCCHs are soft combined to achieve better PDCCH decoding performance). Moreover, in such embodiments, each DCI corresponds to two blind decodes in a TTI. Upon detection of a DL DCI, the UE may do the following: for a detected PDCCH, if rate-matching around the detected PDCCH in the CORSET is configured/indicated in the physical layer, the UE may decode PDSCH assuming rate-matching around the detected PDCCH; otherwise, the detected PDCCH may puncture the PDSCH.

In certain embodiments, a DL PDCCH may be transmitted once or twice in the frequency domain 406 in different CORESETs to increase the PDCCH detection reliability. In one embodiment, an eNB (or gNB) may transmit a PDCCH once instead of twice in the frequency domain 406 and may use other means to increase the reliability of the PDCCH, such as by transmitting the PDCCH using different beams.

In some embodiments, if there are additional higher layer or physical layer rate-matching rules (e.g., similar to rate-matching rules defined for sTTI operation—for example, rate-matching around a CORESET), those rules may apply and the puncturing described herein may be replaced by rate-matching (e.g., around the second CORSET 404 containing the second PDCCH transmission 410).

In various embodiments, a UE may be configured to monitor a first number of PDCCH candidates without repetition (e.g., PDCCH candidates in the first CORESET 402) and a second number of PDCCH candidates with repetition (e.g., PDCCH candidates with PDCCH transmissions in the first CORESET 402 and the second CORESET 404) to receive a given DCI. In such embodiments, a PDCCH candidate with repetition may have one or more PDCCH candidates without repetition as constituent PDCCH transmissions—for example, a first constituent PDCCH transmission of a PDCCH candidate with repetition may also be a PDCCH candidate without repetition while a second constituent PDCCH transmission of the PDCCH candidate with repetition may not correspond to any of the PDCCH candidates without repetition. In one embodiment, the first number of PDCCH candidates without repetition may be in the first CORESET 402.

In certain embodiments, a UE may be configured with a rate-matching first mode, for example, to rate-match around CORESETs corresponding to PDCCH with repetition (i.e., the CORESETs for each of the constituent PDCCH transmissions, e.g., the first CORESET 402 and the second CORESET in FIG. 4) if the UE decodes either a PDCCH candidate with repetition or a constituent PDCCH transmission that is also configured to be monitored independently as a PDCCH candidate (e.g., without repetition). In contrast, if the UE decodes a PDCCH candidate that is not a constituent PDCCH transmission of any PDCCH candidate with repetition, then the UE may be configured with a second rate-matching mode (e.g., rate-match around only the decoded PDCCH candidate). In some embodiments, the rate-matching modes may include rate-matching signaling and/or UE-behavior defined with sTTI operation.

In various embodiments, if a UE decodes a PDCCH candidate (e.g., without repetition) that is a constituent PDCCH transmission of a PDCCH candidate with repetition, the UE may also attempt to decode the PDCCH candidate with repetition to determine whether the eNB transmitted the PDCCH without repetition or with repetition. In such embodiments, if the UE determines that the PDCCH is transmitted without repetition, then the UE may assume a first PDCCH rate-matching mode and/or operation (e.g., the PDSCH is rate-matched around the PDCCH candidate without repetition). Moreover, in such embodiments, if the UE determines that the PDCCH is transmitted with repetition, then the UE may assume a second PDCCH rate-matching mode and/or operation (e.g., the PDSCH is rate-matched around the PDCCH candidate with repetition—i.e., around all of the constituent PDCCH transmissions). In another embodiment of the first PDCCH rate-matching mode and/or operation, a UE may assume that the PDSCH is rate-matched around a PDCCH candidate without repetition, as well as CORESETs corresponding to other constituent PDCCHs of any PDCCH candidate with repetition for which the PDCCH candidate (without repetition) is a constituent PDCCH.

In one embodiment, to avoid ambiguity (e.g., a UE may successfully decode PDCCH transmissions using more than one repetition level—for example, without repetition and/or with repetition) between PDCCH candidate without repetition and a PDCCH candidate with repetition that includes the PDCCH candidate without repetition as a constituent PDCCH transmission, the constituent PDCCH transmission (of the PDCCH candidate with repetition) may be made different or distinguished relative to the PDCCH candidate without repetition, for example, by one or more of the following: 1) applying a different scrambling sequence to the constituent PDCCH transmission (or the PDCCH candidate with repetition) and the PDCCH candidate without repetition—the scrambling sequence may be based on one or more of: PDCCH repetition level, counter of the current constituent PDCCH transmission, CORESET ID of the constituent PDCCH transmission, and/or starting location (e.g., PRB index, CCE Index, REG index, OFDM symbol index, slot index) of the PDCCH transmission. The scrambling sequence may be applied to the coded bits or to the information bits; 2) cyclic shifting the information bits or the coded bits of the DCI for the constituent PDCCH transmission relative to the PDCCH candidate without repetition. The amount of shift may be based on one or more of PDCCH repetition level, counter of the current constituent PDCCH transmission, CORESET ID of the constituent PDCCH transmission, and/or starting location (e.g., PRB index, CCE Index, REG Index, OFDM symbol index, slot index) of the constituent PDCCH transmission. For example, no cyclic shift is applied for the PDCCH candidate without repetition, while a cyclic shift is applied for constituent PDCCH transmission of a PDCCH candidate with repetition; 3) using different rate-matching mechanism (e.g., different starting bit index or RV during rate-matching (e.g., rate-matching circular buffer)) for the constituent PDCCH transmission relative to the PDCCH candidate without repetition. The starting bit index may be based on one or more of PDCCH repetition level, counter of the current constituent PDCCH transmission, CORESET ID of the constituent PDCCH transmission, and/or starting location (e.g., PRB index, CCE Index, REG Index, OFDM symbol index, slot index) of the constituent PDCCH transmission; and 4) modifying the DCI size PDCCH candidate with repetition compared to the DCI size for PDCCH candidate without repetition, e.g., by appending one or zero bits to the DCI information bits. The number of zero bits to append may depend on one or more of PDCCH repetition level, CORESET ID, and/or starting location (e.g., PRB index, CCE Index, REG Index, OFDM symbol index, slot index) of a constituent PDCCH transmission (e.g., first PDCCH transmission).

Certain embodiments to avoid ambiguity may also be used between a PDCCH candidate without repetition and a PDCCH candidate with repetition that does not include the PDCCH candidate without repetition as a constituent PDCCH transmission. Such ambiguity might occur due to overlapping CORESETS, partially overlapping candidate PRBs, and/or CCEs of candidate PDCCH with the same or different aggregation levels. Various embodiments described herein may be applied to distinguish constituent PDCCH transmissions of a PDCCH candidate with repetition to the PDCCH candidate without repetition.

In various embodiments, a PDCCH candidate without repetition corresponds to a PDCCH candidate with a first repetition level, a PDCCH candidate with repetition corresponds to a PDCCH candidate with a second repetition level, and the second repetition level is larger than the first repetition level and may be a multiple of the first repetition level. In one example, the first repetition level is 2, and the second repetition level is 4.

Figure 5:
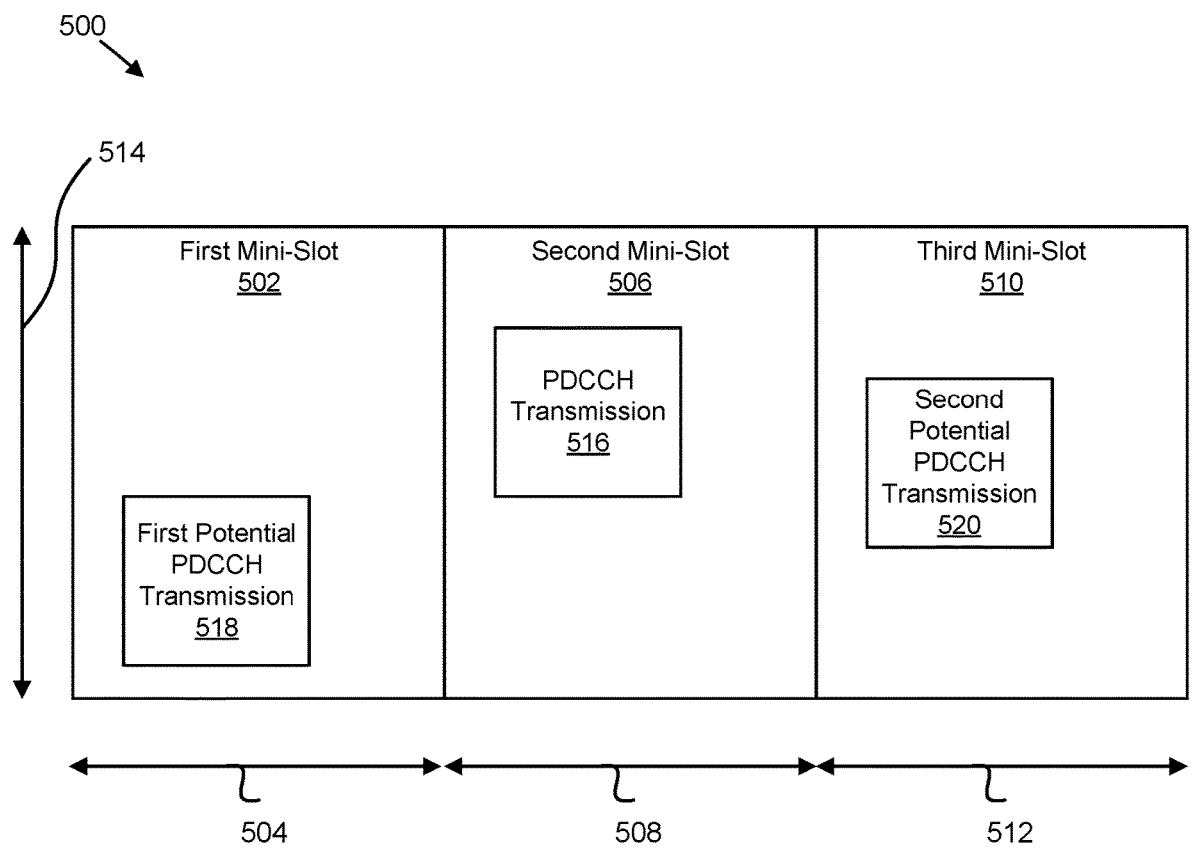
FIG. 5 is a schematic block diagram illustrating another embodiment of communications including a PDCCH repetition.

FIG. 5 is a schematic block diagram illustrating another embodiment of communications 500 including a PDCCH repetition. A first mini-slot 502 ("n−1") is transmitted during a first time 504, a second mini-slot 506 ("n") is transmitted during a second time 508, and a third mini-slot 510 ("n+1") is transmitted during a third time 512. The first mini-slot 502, the second mini-slot 506, and the third mini-slot 510 are transmitted over a frequency range 514. The communications 500 include a PDCCH transmission 516, a first potential PDCCH transmission 518, and a second potential PDCCH transmission 520. A UE may not now whether the first potential PDCCH transmission 518 and/or the second potential PDCCH transmission 520 is a repetition of the PDCCH transmission 516.

In some embodiments, if a first and second PDCCH transmission occur in different time instances, and if PDSCH (e.g., scheduled data) is also repeated in those two time instances, upon detection of the first PDCCH transmission, the UE may rate-match the first PDSCH around the first PDCCH. In such embodiments, the UE may still try to detect the second PDCCH in the second time instance even though it already has decoded the first PDCCH to be able to rate-match the second PDSCH around the second PDCCH.

In certain embodiments, if the PDCCH repetitions in time have a known pattern (e.g., respective location), the UE, upon detection of one PDCCH repetition, may be able to find the location of other repetitions, and then may rate-match PDSCH repetitions around PDCCH repetitions.

In one example, if a UE is configured with 2 PDCCH repetitions (including the PDCCH transmission 516) over two time instances (e.g., TTIs or mini-slots) with the same aggregation level "L" as shown in FIG. 5, assuming W PDCCH candidates with AL=L in a CORSET, if the first PDCCH transmission with AL=L is the mth candidate in the search space, then the second PDCCH transmission with AL=L is the (m+1) mod W candidate in the search space in the next time instance. The UE may have detected the PDCCH transmission 516 in the second mini-slot 506, and may not know if the PDCCH is the first PDCCH transmission or the second PDCCH transmission. The UE may perform two blind detections: (1) by assuming the first and second mini-slots 502, 506 {n−1, n} include the first PDCCH transmission and the second PDCCH transmission given that the detected PDCCH transmission 506 is in the second mini-slot 506; and (2) by assuming the second and third mini-slots 506, 510 {n, n+1} include the first PDCCH transmission and the second PDCCH transmission given that the detected PDCCH transmission 506 is in the second mini-slot 506. If the UE successfully decodes the PDCCH based on (e.g., by combining) the first potential (e.g., candidate) PDCCH transmission 518 in the first mini-slot 502 and the PDCCH transmission 516 in the second mini-slot 506, then the UE assumes the PDSCH received in the first mini-slot 502 is rate matched around the first potential PDCCH transmission 518 in the first mini-slot 502, and the PDSCH received in the second mini-slot 506 is rate matched around the PDCCH transmission 516 in the second mini-slot 506, and then decodes the PDSCH based on the received PDSCH in the first mini-slot 502 and the received PDSCH in the second mini-slot 506 (e.g., combines (e.g., LLR combining) the received PDSCH transmissions in the first mini-slot 502 and the second mini-slot 504 and decodes the resulting combined PDSCH transmission). If the UE does not find a PDCCH in the first mini-slot 502, then the UE tries to decode PDSCH in the second mini-slot 506 by rate matching the PDSCH around the PDCCH transmission 516 in the second mini-slot 506. If this PDSCH decoding is not successful, then the UE waits until the third mini-slot 510, and tries to decode PDSCH given first and second PDSCH transmissions in the second mini-slot 506 and the third mini-slot 510, assuming the second PDSCH transmission is rate-matched around the second potential PDCCH transmission 520. In certain embodiments, a UE tries to detect the second potential PDCCH transmission 520 first, and, upon such detection, then combines PDSCHs.

Figure 6:
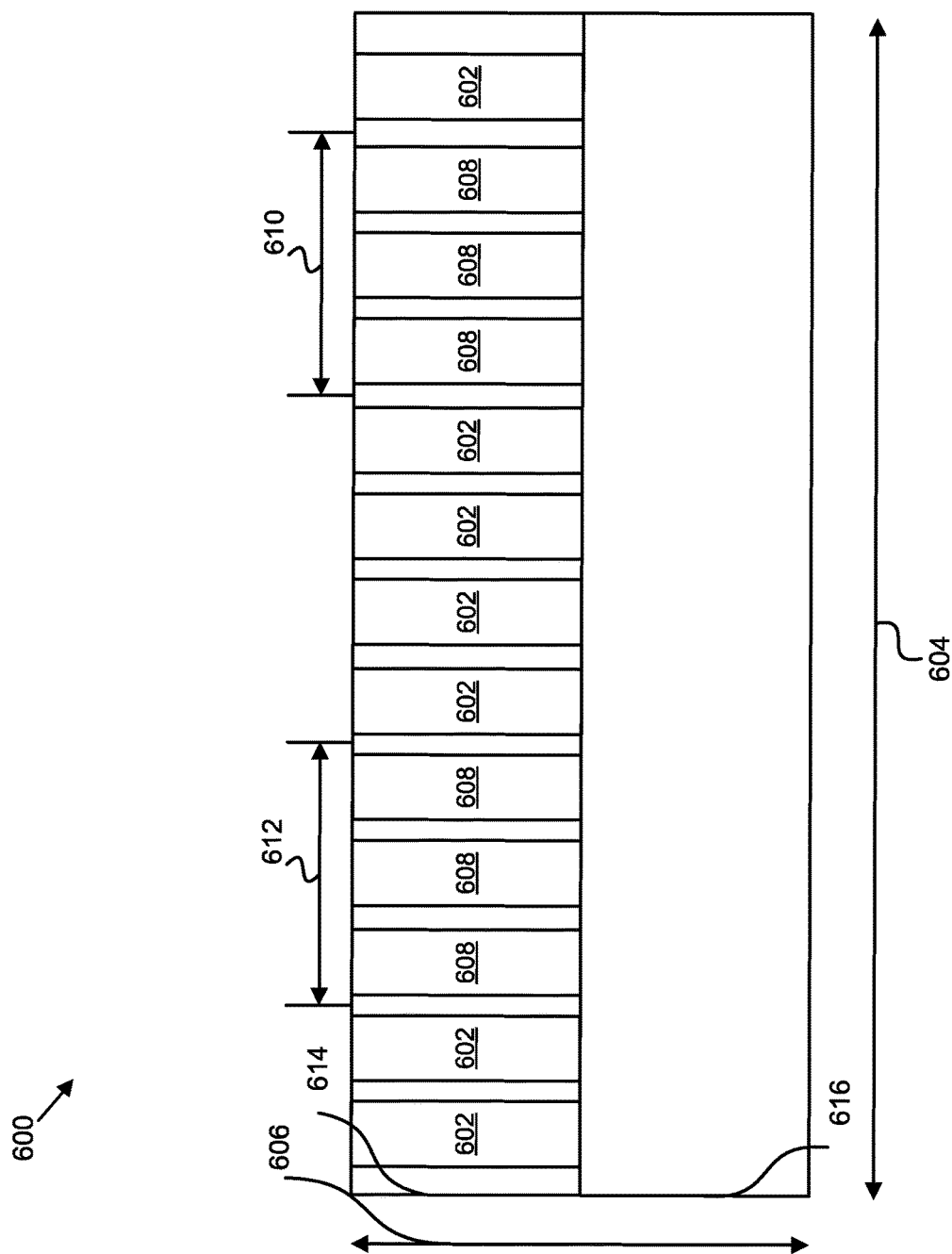
FIG. 6 is a schematic block diagram illustrating a further embodiment of communications including a PDCCH repetition.

FIG. 6 is a schematic block diagram illustrating a further embodiment of communications 600 including a PDCCH repetition. The communications 600 include data DMRS 602 transmitted over a frequency range 604 and a time range 606. The communications 600 also include control DMRS 608 transmitted over the frequency range 604 and the time range 606. The communications 600 include a first PDCCH transmission 610 and a second PDCCH transmission 612.

In some embodiments, if the control DMRS 608 are repeated in a TTI (e.g., due to PDCCH repetition), the control DMRS 608 and the data DMRS 602 may not be shared unless respective locations of the PDCCH repetitions is known. In such embodiments, if the control DMRS 608 is transmitted only once, then the control DMRS 608 and the data DMRS 602 may be shared if configured and/or indicated.

In certain embodiments, PDSCH is scheduled over the frequency range 604. In certain embodiments, the first PDCCH transmission 610 is in a first CORESET, while the second PDCCH transmission 612 is in a second CORESET. In some embodiments, PDSCH may be scheduled over two OFDM symbols 614 and 616. In various embodiments, the data DMRS 602 and the control DMRS 608 share the same OFDM symbol 614. In certain embodiments, if the UE has detected the first PDCCH transmission 610, but not the second PDCCH 612, and if the control DMRS 608 and the data DMRS 602 patterns are different, the UE may not be able to use the DMRS associated with the second PDCCH 612 transmission (repetition) if the UE cannot determine the second PDCCH resources. One solution to this is to use the same DMRS pattern for the control DMRS 608 and the data DMRS 602. Another solution may be for the frequency span of the CORESETs overlapping with PDSCH allocation, the data DMRS 602 is placed in the second symbol 616 as shown in FIG. 7.

Figure 7:
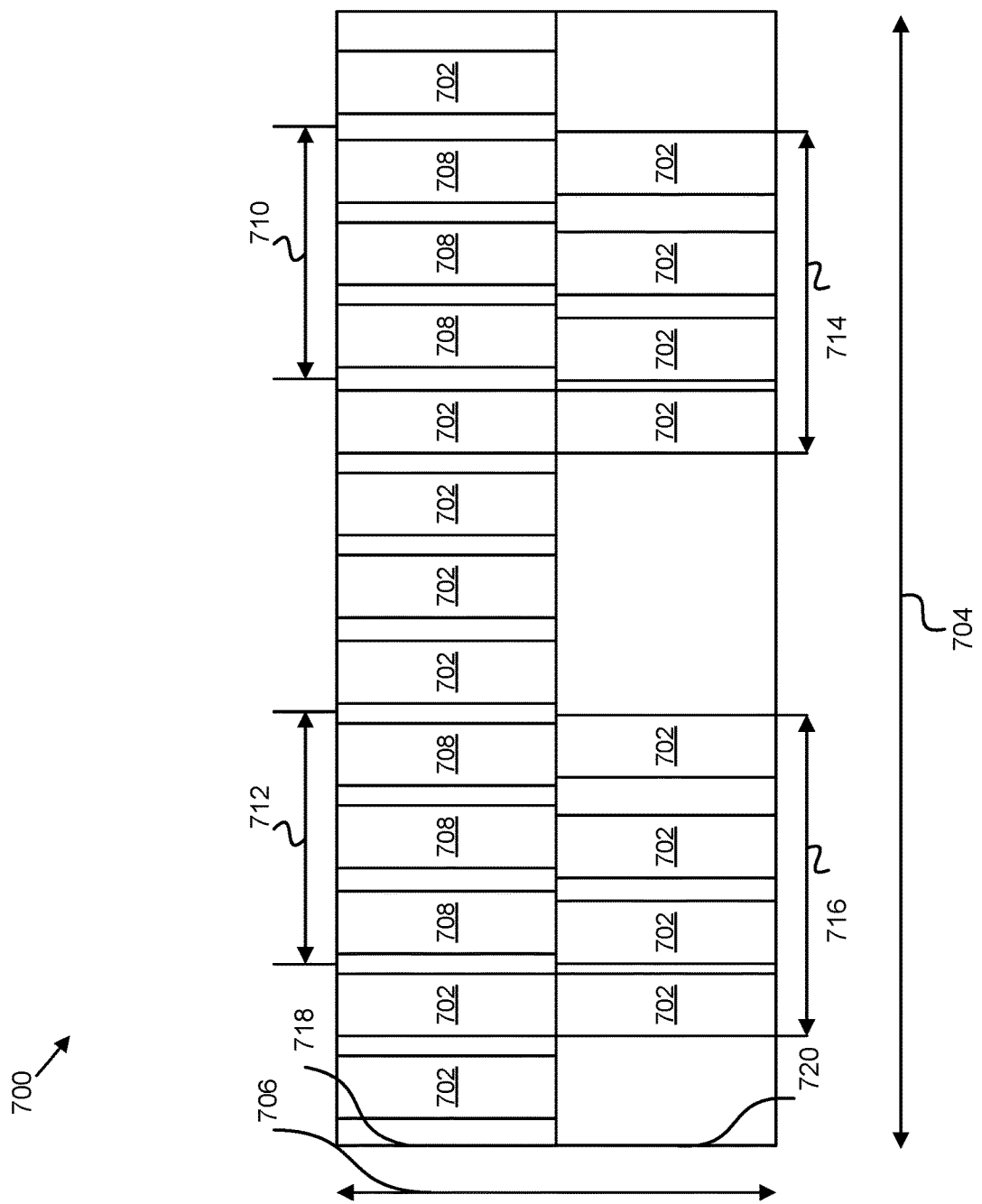
FIG. 7 is a schematic block diagram illustrating yet another embodiment of communications including a PDCCH repetition.

FIG. 7 is a schematic block diagram illustrating yet another embodiment of communications 700 including a PDCCH repetition. The communications 700 include data DMRS 702 transmitted over a frequency range 704 and a time range 706. The communications 700 also include control DMRS 708 transmitted over the frequency range 704 and the time range 706. The communications 700 include a first PDCCH transmission 710 and a second PDCCH transmission 712. The first PDCCH transmission 710 is transmitted within a first CORESET 714, and the second PDCCH transmission 712 is transmitted within a second CORESET 716.

In some embodiments, PDSCH may be scheduled over two OFDM symbols 718 and 720. In various embodiments, the data DMRS 702 and the control DMRS 708 share the same OFDM symbol 718. Furthermore, the control DMRS 708 may only be present in the first symbol 718, while the data DMRS 702 is present in both symbols 718 and 720. In certain embodiments, the data DMRS 702 in the second symbol 720 overlapping the first and second CORESETs 714 and 716 and the PDSCH allocation may be RRC or L1 (e.g., layer 1/physical layer) signaling configured.

In some embodiments, if multiple PDCCHs are transmitted (e.g., having the same DCI), their respective location may be indicated to a UE by the network. For instance, a CRC mask of the PDCCH may indicate one or more of the following: whether PDCCH is transmitted and/or repeated multiple times, and if so how many; which one of possible respective locations is used for transmission of multiple PDCCHs (e.g., in which CORESETs the multiple PDCCHs are); and/or a counter of a current PDCCH transmission—the transmission number of the current PDCCH transmission (e.g., whether the current PDCCH transmission is the first PDCCH transmission or the second PDCCH transmission of the PDCCH candidate with repetition).

In certain embodiments, CRC bits for a PDCCH payload are generated, and then a CRC mask or the CRC bits are scrambled according to modulo-2, and added to the generated CRC (e.g., the CRC mask may also include a sequence of bits (referred to as an RNTI) which is modulo-2 added).

In various embodiments, if a UE decodes a PDCCH (e.g., out of multiple repeated PDCCHs), it may use multiple CRC masks to de-mask the CRC (e.g., from the decoded CRC bits). In such embodiments, the UE determines the PDCCH repetition related information indicated as CRC masks as described herein. The CRC-masks may be RRC configured for the UE as multiple RNTI or derived from a single RNTI based on a formula or table mapping PDCCH repetition related information to different CRC mask patterns.

Figure 8:
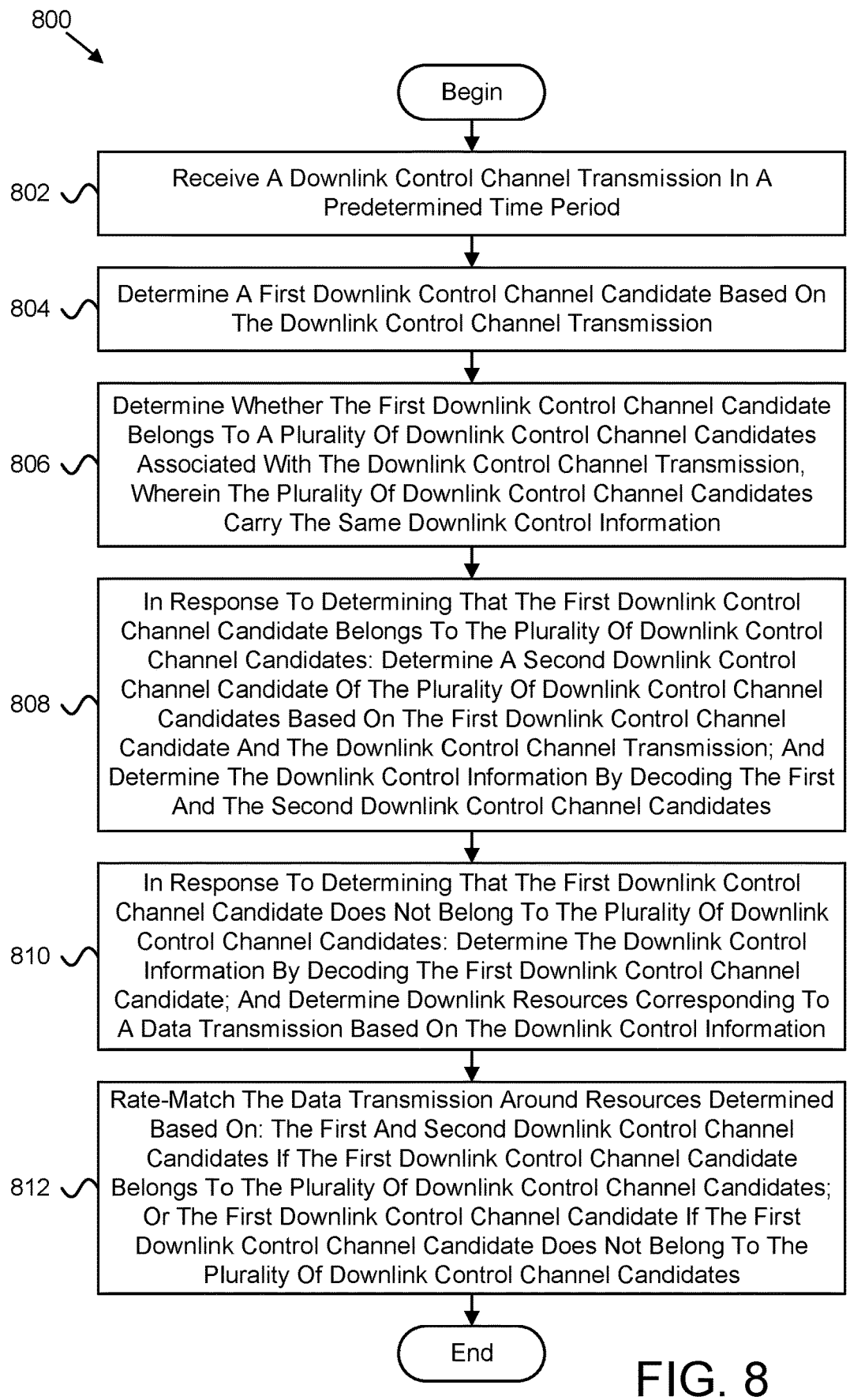
FIG. 8 is a flow chart diagram illustrating one embodiment of a method for rate-matching a data transmission around resources.

FIG. 8 is a flow chart diagram illustrating one embodiment of a method 800 for rate-matching a data transmission around resources. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a downlink control channel transmission in a predetermined time period. In certain embodiments, the method 800 includes determining 804 a first downlink control channel candidate based on the downlink control channel transmission. In some embodiments, the method 800 includes determining 806 whether the first downlink control channel candidate belongs to a plurality of downlink control channel candidates associated with the downlink control channel transmission. In such embodiments, the plurality of downlink control channel candidates carry the same downlink control information. In various embodiments, in response to determining that the first downlink control channel candidate belongs to the plurality of downlink control channel candidates, the method 800 includes: determining 808 a second downlink control channel candidate of the plurality of downlink control channel candidates based on the first downlink control channel candidate and the downlink control channel transmission; and determining the downlink control information by decoding the first and the second downlink control channel candidates. In certain embodiments, in response to determining that the first downlink control channel candidate does not belong to the plurality of downlink control channel candidates, the method 800 includes: determining 810 the downlink control information by decoding the first downlink control channel candidate; and determining downlink resources corresponding to a data transmission based on the downlink control information. In some embodiments, the method 800 includes rate-matching 812 the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates.

In certain embodiments, rate-matching the data transmission around the resources is performed if the indication to perform the rate-matching is received via higher layer signaling or via the downlink control information. In some embodiments, the first downlink control channel candidate is in a first control resource set; the second downlink control channel candidate is in a second control resource set; and a user equipment attempts to decode downlink control channel candidates in the first and the second control resource sets. In various embodiments, rate-matching the data transmission around resources further comprises rate-matching around at least one of the first and second control resource sets.

In one embodiment, the method 800 comprises receiving an indication indicating the plurality of downlink control channel candidates carrying the same downlink control information in the predetermined time period. In certain embodiments, the predetermined time period comprises a transmission time interval. In some embodiments, the resources around which the rate-matching is performed are determined based on a pattern (e.g., sequence of bits in a bit field) indicated via the downlink control information.

In various embodiments, the pattern is associated with (e.g., mapped to): a first set of resources if the first downlink control channel candidate belongs to the plurality of downlink control channel candidates; and a second set of resources if the first downlink control channel candidate does not belong to the plurality of downlink control channel candidates. In one embodiment, determining whether the first downlink control channel candidate belongs to the plurality of downlink control channel candidates comprises determining whether the first downlink control channel candidate belongs to the plurality of downlink control channel candidates based on: a scrambling sequence associated with the first downlink control channel candidate; a cyclic shift of downlink control information bits associated with the first downlink control channel candidate; a rate-matching of downlink control information bits associated with the first downlink control channel candidate; a number of downlink control information bits with a known value; a radio network identifier used to scramble a cyclic redundancy check of the first downlink control channel candidate; or some combination thereof.

In certain embodiments, at least one of the scrambling sequence, the cyclic shift, and the rate-matching of downlink control information bits is based on: a number of downlink control channel candidates of the plurality of downlink control channel candidates; an index of the first downlink control channel candidate within the plurality of downlink control channel candidates; a control resource set index of the first downlink control channel candidate; a time resource of the first downlink control channel candidate; a frequency resource of the first downlink control channel candidate; or some combination thereof.

In some embodiments, an index of the first downlink control channel candidate is indicated via the downlink control information. In various embodiments, a number of downlink control channel candidates of the plurality of downlink control channel candidates is indicated via the downlink control information. In one embodiment, determining whether the first downlink control channel candidate belongs to the plurality of downlink control channel candidates comprises determining whether the first downlink control channel candidate belongs to the plurality of downlink control channel candidates based on a scrambling sequence associated with the first downlink control channel candidate.

In certain embodiments, determining whether the first downlink control channel candidate belongs to the plurality of downlink control channel candidates comprises determining whether the first downlink control channel candidate belongs to the plurality of downlink control channel candidates based on a cyclic shift of downlink control information bits associated with the first downlink control channel candidate. In some embodiments, determining whether the first downlink control channel candidate belongs to the plurality of downlink control channel candidates comprises determining whether the first downlink control channel candidate belongs to the plurality of downlink control channel candidates based on a rate-matching of downlink control information bits associated with the first downlink control channel candidate.

In various embodiments, determining whether the first downlink control channel candidate belongs to the plurality of downlink control channel candidates comprises determining whether the first downlink control channel candidate belongs to the plurality of downlink control channel candidates based on a number of downlink control information bits with a known value. In one embodiment, determining whether the first downlink control channel candidate belongs to the plurality of downlink control channel candidates comprises determining whether the first downlink control channel candidate belongs to the plurality of downlink control channel candidates based on a radio network identifier used to scramble a cyclic redundancy check of the first downlink control channel candidate.

In certain embodiments, decoding the first and the second downlink control channel candidates comprises decoding the first and the second downlink control channel candidates jointly. In some embodiments, the resources are determined based on a field in the downlink control information. In various embodiments, the field indicates: a first set of resources for rate-matching if the first downlink control channel candidate is not jointly decoded with another control channel candidate to determine the downlink control information; and a second set of resources for rate-matching if the first downlink control channel candidate is jointly decoded with another control channel candidate to determine the downlink control information.

In one embodiment, a method comprises: receiving a downlink control channel transmission in a predetermined time period; determining a first downlink control channel candidate based on the downlink control channel transmission; determining whether the first downlink control channel candidate belongs to a plurality of downlink control channel candidates associated with the downlink control channel transmission, wherein the plurality of downlink control channel candidates carry the same downlink control information; in response to determining that the first downlink control channel candidate belongs to the plurality of downlink control channel candidates: determining a second downlink control channel candidate of the plurality of downlink control channel candidates based on the first downlink control channel candidate and the downlink control channel transmission; and determining the downlink control information by decoding the first and the second downlink control channel candidates; in response to determining that the first downlink control channel candidate does not belong to the plurality of downlink control channel candidates: determining the downlink control information by decoding the first downlink control channel candidate; and determining downlink resources corresponding to a data transmission based on the downlink control information; and rate-matching the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates.

In certain embodiments, rate-matching the data transmission around the resources is performed if the indication to perform the rate-matching is received via higher layer signaling or via the downlink control information.

In some embodiments, the first downlink control channel candidate is in a first control resource set; the second downlink control channel candidate is in a second control resource set; and a user equipment attempts to decode downlink control channel candidates in the first and the second control resource sets.

In various embodiments, rate-matching the data transmission around resources further comprises rate-matching around at least one of the first and second control resource sets.

In one embodiment, the method comprises receiving an indication indicating the plurality of downlink control channel candidates carrying the same downlink control information in the predetermined time period.

In certain embodiments, the predetermined time period comprises a transmission time interval.

In some embodiments, the resources around which the rate-matching is performed are determined based on a pattern indicated via the downlink control information.

In various embodiments, the pattern is associated with: a first set of resources if the first downlink control channel candidate belongs to the plurality of downlink control channel candidates; and a second set of resources if the first downlink control channel candidate does not belong to the plurality of downlink control channel candidates.

In one embodiment, determining whether the first downlink control channel candidate belongs to the plurality of downlink control channel candidates comprises determining whether the first downlink control channel candidate belongs to the plurality of downlink control channel candidates based on: a scrambling sequence associated with the first downlink control channel candidate; a cyclic shift of downlink control information bits associated with the first downlink control channel candidate; a rate-matching of downlink control information bits associated with the first downlink control channel candidate; a number of downlink control information bits with a known value; a radio network identifier used to scramble a cyclic redundancy check of the first downlink control channel candidate; or some combination thereof.

In certain embodiments, at least one of the scrambling sequence, the cyclic shift, and the rate-matching of downlink control information bits is based on: a number of downlink control channel candidates of the plurality of downlink control channel candidates; an index of the first downlink control channel candidate within the plurality of downlink control channel candidates; a control resource set index of the first downlink control channel candidate; a time resource of the first downlink control channel candidate; a frequency resource of the first downlink control channel candidate; or some combination thereof.

In some embodiments, an index of the first downlink control channel candidate is indicated via the downlink control information.

In various embodiments, a number of downlink control channel candidates of the plurality of downlink control channel candidates is indicated via the downlink control information.

In one embodiment, determining whether the first downlink control channel candidate belongs to the plurality of downlink control channel candidates comprises determining whether the first downlink control channel candidate belongs to the plurality of downlink control channel candidates based on a scrambling sequence associated with the first downlink control channel candidate.

In certain embodiments, determining whether the first downlink control channel candidate belongs to the plurality of downlink control channel candidates comprises determining whether the first downlink control channel candidate belongs to the plurality of downlink control channel candidates based on a cyclic shift of downlink control information bits associated with the first downlink control channel candidate.

In some embodiments, determining whether the first downlink control channel candidate belongs to the plurality of downlink control channel candidates comprises determining whether the first downlink control channel candidate belongs to the plurality of downlink control channel candidates based on a rate-matching of downlink control information bits associated with the first downlink control channel candidate.

In various embodiments, determining whether the first downlink control channel candidate belongs to the plurality of downlink control channel candidates comprises determining whether the first downlink control channel candidate belongs to the plurality of downlink control channel candidates based on a number of downlink control information bits with a known value.

In one embodiment, determining whether the first downlink control channel candidate belongs to the plurality of downlink control channel candidates comprises determining whether the first downlink control channel candidate belongs to the plurality of downlink control channel candidates based on a radio network identifier used to scramble a cyclic redundancy check of the first downlink control channel candidate.

In certain embodiments, decoding the first and the second downlink control channel candidates comprises decoding the first and the second downlink control channel candidates jointly.

In some embodiments, the resources are determined based on a field in the downlink control information.

In various embodiments, the field indicates: a first set of resources for rate-matching if the first downlink control channel candidate is not jointly decoded with another control channel candidate to determine the downlink control information; and a second set of resources for rate-matching if the first downlink control channel candidate is jointly decoded with another control channel candidate to determine the downlink control information.

In one embodiment, an apparatus comprises: a receiver that receives a downlink control channel transmission in a predetermined time period; and a processor that: determines a first downlink control channel candidate based on the downlink control channel transmission; determines whether the first downlink control channel candidate belongs to a plurality of downlink control channel candidates associated with the downlink control channel transmission, wherein the plurality of downlink control channel candidates carry the same downlink control information; in response to determining that the first downlink control channel candidate belongs to the plurality of downlink control channel candidates: determines a second downlink control channel candidate of the plurality of downlink control channel candidates based on the first downlink control channel candidate and the downlink control channel transmission; and determines the downlink control information by decoding the first and the second downlink control channel candidates; in response to determining that the first downlink control channel candidate does not belong to the plurality of downlink control channel candidates: determines the downlink control information by decoding the first downlink control channel candidate; and determines downlink resources corresponding to a data transmission based on the downlink control information; and rate-matches the data transmission around resources determined based on: the first and second downlink control channel candidates if the first downlink control channel candidate belongs to the plurality of downlink control channel candidates; or the first downlink control channel candidate if the first downlink control channel candidate does not belong to the plurality of downlink control channel candidates.

In certain embodiments, the processor rate-matches the data transmission around the resources if an indication to perform the rate-matching is received via higher layer signaling or via the downlink control information.

In some embodiments, the first downlink control channel candidate is in a first control resource set; the second downlink control channel candidate is in a second control resource set; and the apparatus attempts to decode downlink control channel candidates in the first and the second control resource sets.

In various embodiments, the processor rate-matches the data transmission around resources by rate-matching around at least one of the first and second control resource sets.

In one embodiment, the receiver receives an indication indicating the plurality of downlink control channel candidates carrying the same downlink control information in the predetermined time period.

In certain embodiments, the predetermined time period comprises a transmission time interval.

In some embodiments, the resources around which the rate-matching is performed are determined based on a pattern indicated via the downlink control information.

In various embodiments, the pattern is associated with: a first set of resources if the first downlink control channel candidate belongs to the plurality of downlink control channel candidates; and a second set of resources if the first downlink control channel candidate does not belong to the plurality of downlink control channel candidates.

In one embodiment, the processor determines whether the first downlink control channel candidate belongs to the plurality of downlink control channel candidates by determining whether the first downlink control channel candidate belongs to the plurality of downlink control channel candidates based on: a scrambling sequence associated with the first downlink control channel candidate; a cyclic shift of downlink control information bits associated with the first downlink control channel candidate; a rate-matching of downlink control information bits associated with the first downlink control channel candidate; a number of downlink control information bits with a known value; a radio network identifier used to scramble a cyclic redundancy check of the first downlink control channel candidate; or some combination thereof.

In certain embodiments, at least one of the scrambling sequence, the cyclic shift, and the rate-matching of downlink control information bits is based on: a number of downlink control channel candidates of the plurality of downlink control channel candidates; an index of the first downlink control channel candidate within the plurality of downlink control channel candidates; a control resource set index of the first downlink control channel candidate; a time resource of the first downlink control channel candidate; a frequency resource of the first downlink control channel candidate; or some combination thereof.

In some embodiments, an index of the first downlink control channel candidate is indicated via the downlink control information.

In various embodiments, a number of downlink control channel candidates of the plurality of downlink control channel candidates is indicated via the downlink control information.

In one embodiment, the processor determines whether the first downlink control channel candidate belongs to the plurality of downlink control channel candidates by determining whether the first downlink control channel candidate belongs to the plurality of downlink control channel candidates based on a scrambling sequence associated with the first downlink control channel candidate.

In certain embodiments, the processor determines whether the first downlink control channel candidate belongs to the plurality of downlink control channel candidates by determining whether the first downlink control channel candidate belongs to the plurality of downlink control channel candidates based on a cyclic shift of downlink control information bits associated with the first downlink control channel candidate.

In some embodiments, the processor determines whether the first downlink control channel candidate belongs to the plurality of downlink control channel candidates by determining whether the first downlink control channel candidate belongs to the plurality of downlink control channel candidates based on a rate-matching of downlink control information bits associated with the first downlink control channel candidate.

In various embodiments, the processor determines whether the first downlink control channel candidate belongs to the plurality of downlink control channel candidates by determining whether the first downlink control channel candidate belongs to the plurality of downlink control channel candidates based on a number of downlink control information bits with a known value.

In one embodiment, the processor determines whether the first downlink control channel candidate belongs to the plurality of downlink control channel candidates by determining whether the first downlink control channel candidate belongs to the plurality of downlink control channel candidates based on a radio network identifier used to scramble a cyclic redundancy check of the first downlink control channel candidate.

In certain embodiments, the processor decodes the first and the second downlink control channel candidates by decoding the first and the second downlink control channel candidates jointly.

In some embodiments, the resources are determined based on a field in the downlink control information.

In various embodiments, the field indicates: a first set of resources for rate-matching if the first downlink control channel candidate is not jointly decoded with another control channel candidate to determine the downlink control information; and a second set of resources for rate-matching if the first downlink control channel candidate is jointly decoded with another control channel candidate to determine the downlink control information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving a downlink control channel transmission in a predetermined time period;
determining a first downlink control channel candidate based on the downlink control channel transmission;
determining whether the first downlink control channel candidate belongs to a plurality of downlink control channel candidates associated with the downlink control channel transmission, wherein the plurality of downlink control channel candidates carry the same downlink control information;
in response to determining that the first downlink control channel candidate belongs to the plurality of downlink control channel candidates:
determining a second downlink control channel candidate of the plurality of downlink control channel candidates based on the first downlink control channel candidate and the downlink control channel transmission; and
determining the downlink control information by decoding the first and the second downlink control channel candidates;
in response to determining that the first downlink control channel candidate does not belong to the plurality of downlink control channel candidates:
determining the downlink control information by decoding the first downlink control channel candidate; and
determining downlink resources corresponding to a data transmission based on the downlink control information; and
rate-matching the data transmission around resources determined based on:
the first and second downlink control channel candidates if the first downlink control channel candidate belongs to the plurality of downlink control channel candidates; or
the first downlink control channel candidate if the first downlink control channel candidate does not belong to the plurality of downlink control channel candidates.

2. The method of claim 1, wherein rate-matching the data transmission around the resources is performed if the indication to perform the rate-matching is received via higher layer signaling or via the downlink control information.

3. The method of claim 1, wherein:
the first downlink control channel candidate is in a first control resource set;
the second downlink control channel candidate is in a second control resource set; and
a user equipment attempts to decode downlink control channel candidates in the first and the second control resource sets.

4. The method of claim 3, wherein rate-matching the data transmission around resources further comprises rate-matching around at least one of the first and second control resource sets.

5. The method of claim 1, further comprising receiving an indication indicating the plurality of downlink control channel candidates carrying the same downlink control information in the predetermined time period.

6. The method of claim 5, wherein the predetermined time period comprises a transmission time interval.

7. The method of claim 1, wherein the resources around which the rate-matching is performed are determined based on a pattern indicated via the downlink control information.

8. The method of claim 7, wherein the pattern is associated with:
a first set of resources if the first downlink control channel candidate belongs to the plurality of downlink control channel candidates; and
a second set of resources if the first downlink control channel candidate does not belong to the plurality of downlink control channel candidates.

9. The method of claim 1, wherein determining whether the first downlink control channel candidate belongs to the plurality of downlink control channel candidates comprises determining whether the first downlink control channel candidate belongs to the plurality of downlink control channel candidates based on:
- a scrambling sequence associated with the first downlink control channel candidate;
- a cyclic shift of downlink control information bits associated with the first downlink control channel candidate;
- a rate-matching of downlink control information bits associated with the first downlink control channel candidate;
- a number of downlink control information bits with a known value;
- a radio network identifier used to scramble a cyclic redundancy check of the first downlink control channel candidate; or
- some combination thereof.

10. The method of claim 9, wherein at least one of the scrambling sequence, the cyclic shift, and the rate-matching of downlink control information bits is based on:
- a number of downlink control channel candidates of the plurality of downlink control channel candidates;
- an index of the first downlink control channel candidate within the plurality of downlink control channel candidates;
- a control resource set index of the first downlink control channel candidate;
- a time resource of the first downlink control channel candidate;
- a frequency resource of the first downlink control channel candidate; or
- some combination thereof.

11. The method of claim 1, wherein an index of the first downlink control channel candidate is indicated via the downlink control information.

12. The method of claim 1, wherein a number of downlink control channel candidates of the plurality of downlink control channel candidates is indicated via the downlink control information.

13. The method of claim 1, wherein determining whether the first downlink control channel candidate belongs to the plurality of downlink control channel candidates comprises determining whether the first downlink control channel candidate belongs to the plurality of downlink control channel candidates based on a scrambling sequence associated with the first downlink control channel candidate.

14. The method of claim 1, wherein determining whether the first downlink control channel candidate belongs to the plurality of downlink control channel candidates comprises determining whether the first downlink control channel candidate belongs to the plurality of downlink control channel candidates based on a cyclic shift of downlink control information bits associated with the first downlink control channel candidate.

15. The method of claim 1, wherein determining whether the first downlink control channel candidate belongs to the plurality of downlink control channel candidates comprises determining whether the first downlink control channel candidate belongs to the plurality of downlink control channel candidates based on a rate-matching of downlink control information bits associated with the first downlink control channel candidate.

16. The method of claim 1, wherein determining whether the first downlink control channel candidate belongs to the plurality of downlink control channel candidates comprises determining whether the first downlink control channel candidate belongs to the plurality of downlink control channel candidates based on a radio network identifier used to scramble a cyclic redundancy check of the first downlink control channel candidate.

17. The method of claim 1, wherein the resources are determined based on a field in the downlink control information and the field indicates:
- a first set of resources for rate-matching if the first downlink control channel candidate is not jointly decoded with another control channel candidate to determine the downlink control information; and
- a second set of resources for rate-matching if the first downlink control channel candidate is jointly decoded with another control channel candidate to determine the downlink control information.

18. An apparatus comprising:
a receiver that receives a downlink control channel transmission in a predetermined time period; and
a processor that:
- determines a first downlink control channel candidate based on the downlink control channel transmission;
- determines whether the first downlink control channel candidate belongs to a plurality of downlink control channel candidates associated with the downlink control channel transmission, wherein the plurality of downlink control channel candidates carry the same downlink control information;
- in response to determining that the first downlink control channel candidate belongs to the plurality of downlink control channel candidates:
  - determines a second downlink control channel candidate of the plurality of downlink control channel candidates based on the first downlink control channel candidate and the downlink control channel transmission; and
  - determines the downlink control information by decoding the first and the second downlink control channel candidates;
- in response to determining that the first downlink control channel candidate does not belong to the plurality of downlink control channel candidates:
  - determines the downlink control information by decoding the first downlink control channel candidate; and
- determines downlink resources corresponding to a data transmission based on the downlink control information; and
- rate-matches the data transmission around resources determined based on:
  - the first and second downlink control channel candidates if the first downlink control channel candidate belongs to the plurality of downlink control channel candidates; or
  - the first downlink control channel candidate if the first downlink control channel candidate does not belong to the plurality of downlink control channel candidates.

19. The apparatus of claim 18, wherein the processor rate-matches the data transmission around the resources if an indication to perform the rate-matching is received via higher layer signaling or via the downlink control information.

20. The apparatus of claim 18, wherein:
the first downlink control channel candidate is in a first control resource set;
the second downlink control channel candidate is in a second control resource set; and the apparatus attempts to decode downlink control channel candidates in the first and the second control resource sets.

\* \* \* \* \*